Sept. 30, 1958　　　T. RUMMEL　　　2,854,318
METHOD OF AND APPARATUS FOR PRODUCING SEMI-CONDUCTOR MATERIALS
Filed June 26, 1957
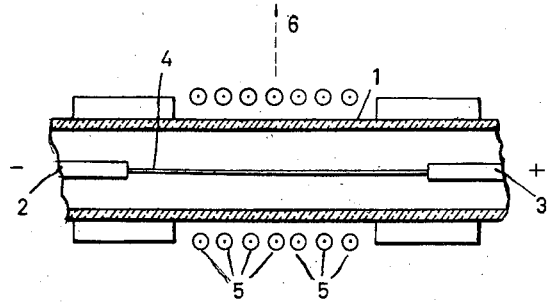
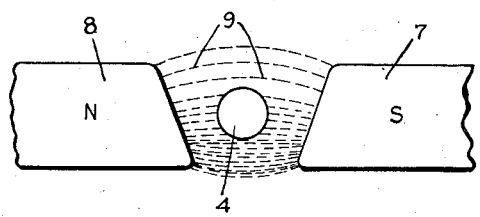
Inventor.
Theodor Rummel.

United States Patent Office 2,854,318
Patented Sept. 30, 1958

2,854,318

METHOD OF AND APPARATUS FOR PRODUCING SEMICONDUCTOR MATERIALS

Theodor Rummel, Munich, Germany, assignor to Siemens and Halske Aktiengesellschaft, Berlin and Munich, Germany, a corporation of Germany Application June 26, 1957, Serial No. 668,209

Claims priority, application Germany July 6, 1956

10 Claims. (Cl. 23—273)

This invention is concerned with a method of and apparatus for producing semiconductor materials, for example, semiconductor monocrystals.

Copending application Serial No. 509,351, filed May 18, 1955, of Friedrick Bischoff and owned by applicant's assignee, describes a method of producing from a gaseous phase, by thermal decomposition, substances of highest purity, preferably for semiconductor purposes, for example, for rectifiers, transistors, fieldistors, photocells operated with or without bias, semiconductor bodies effective electrically or mechanically, preferably resistors, made, for example, of silicon. The most essential feature of the corresponding method resides in precipitating or depositing the material obtained from the gaseous phase upon a carrier consisting of a semiconductor body of the substance that is to be produced. According to an embodiment described in the copending application, the body to be produced is in the form of an elongated or wirelike body which may at the same time serve as a heat source for the thermal decomposition by heating thereof to glow temperature by high frequency and/or radiation and/or direct passage of current therethrough, after preheating by high frequency or another type of heating.

The stresses to which the carrier is subjected by its weight and/or surface forces, may be held below the breaking limit by application of suitable temperature conditions, and dimensioning as well as mounting of the carrier.

The present invention is concerned with an improvement aiming above all at avoiding as far as possible, mechanical stresses put on the carrier body during the operation, so that the body can be heated to a temperature lying just below its melting point or even above the melting point, substantially without causing deformation or dropping off by its own weight.

In accordance with the copending application, silicon-containing compounds, for example halide compounds, especially SiCl₄, are thermally decomposed at the hot surface of the carrier body consisting of the same semiconductor material, if desired, in the presence of a reduction agent, for example, hydrogen, and the semiconductor substance, for example, silicon, is precipitated or deposited in crystalline condition.

It is, however, difficult to practice the method, for example, in the case of silicon, at temperatures exceeding 1200° C., because the carrier becomes ductile, that is, it assumes the flowing stage and warps and easily tears by the mechanical stresses placed on it by its own weight. Operation with the substance in melted condition is, of course, impossible.

The application of high temperatures is otherwise in the case of many reactions desirable, because the reaction speed at which the precipitation of silicon is effected from the gaseous phase, may be considerably increased. For example, according to a rule of thumb, the reaction speed may be about doubled by raising the temperature by 10° C. High reaction speeds, that is, quick precipitation of the crystalline semiconductor substance from the gaseous phase, are favorable, because the material of which the reaction apparatus is made, usually metal and/or glass, is subjected only for short times to the effect of gases reacting at high temperature, for example, SiCl₄, SiCl₃. It is, however, necessary for the production of pure semiconductor materials to avoid as far as possible attacking or only slightly attacking other substances employed for the apparatus according to the invention. Above all, no gaseous reaction product must be formed, containing alien substances, because they would, just as the semiconductor compound, decompose upon the heated carrier body and precipitate thereon, thereby contaminating the semiconductor material.

In accordance with the invention, slight mechanical loading of the carrier body, and the possibility of heating it to temperatures higher than heretofore, are obtained by the provision of means for producing a magnetic supporting field which cancels wholly or in part the effect of gravity acting on the carrier body which is traversed by current flowing therethrough. An arrangement in which the carrier body is disposed horizontally, as in a preferred embodiment of the copending application, is particularly favorable. The magnetic field is in such case suitably so connected that its lines of force extend perpendicular to the axis of the wirelike carrier body and perpendicularly to the direction of gravity. It is particularly advantageous to provide the magnetic field so that it affects the carrier body substantially throughout the length thereof.

The various objects and features of the invention will appear from the description of embodiments which is rendered below with reference to the accompanying drawing.

Fig. 1 shows an embodiment of the invention in diagrammatic, partly sectional view; and Fig. 2 is a schematic sectional view of an embodiment showing the arrangement of means which generates the magnetic field.

A tubular element 1 is made, for example, of quartz glass, forming a chamber to provide for the flow of one, or more gaseous semiconductor compounds. Between the terminals 2 and 3 is disposed an elongated rod or wire shaped semiconductor body 4 upon which the semiconductor material is deposited or precipitated from the gaseous phase. Current is connected to the body 4 to heat it to the desired temperature. Electromagnetic means 5 is provided to produce a magnetic field extending perpendicular to the plane of the drawing. The field strength of the magnetic field is such that the effect of gravity acting in the direction of the arrow 6 is counteracted and partially or wholly cancelled.

The forces generated by the magnetic field, in the carrier body traversed by current, may be made of such magnitude that the body floats in the magnetic field without the aid of any mechanical support. This may be obtained by causing the corresponding means to generate a non-homogeneous magnetic field of great field strength. For example, the pole shoes 7 and 8 of the field-generating electromagnet may be formed so that they exhibit on top a greater spacing than at the bottom, resulting in an increase of field strength in downward direction, as shown in Fig. 2. Referring to Fig. 2, numerals 7 and 8 are the pole shoes of the electromagnet, numeral 4 indicates the carrier body in cross section, and the non-homogeneous magnetic field 9 is schematically illustrated.

The force to which a conductor traversed by current and disposed in a magnetic field is exposed is determined according to the Biot-Savart law by the product of the magnetic inductance B and the magnitude I of the current. Once the carrier body is in the magnetic field in condition of suspension, such condition can be maintained by maintaining constant the product of magnetic inductance B times magnitude of current I. However, semiconductor materials have, as is known, a strong negative resistance coefficient, and the current in the semiconductor body increases considerably with increasing temperature. In order to meet the above explained condition, it will accordingly be necessary to provide for subsequent regulation of the voltage connected to the semiconductor.

In accordance with a particularly advantageous embodiment, the corresponding regulation of the current and the magnetic field may be avoided by using for the heating of the carrier body alternating currents of different frequencies or alternating and direct current in combination. It is thus particularly suitable to conduct through the carrier body direct current of constant strength of a magnitude just sufficient to obtain the condition of suspension by the effect of the magnetic field. Superimposed upon the direct current is an alternating current, preferably an alternating current of high frequency, which is regulated to provide for the desired heating. This superimposed alternating current does not produce any disturbing forces in the magnetic field because the frequency thereof is so high that the rodlike carrier body, due to inertia, cannot follow the oppositely acting forces occurring with each cycle. It may otherwise be advantageous, in some instances, to provide continuously or intermittently for an agitating effect, by the use of alternating current of low frequency, for example, 60 cycles, thereby advantageously affecting the formation of monocrystals.

The metallic terminals may be cooled in known and suitable manner to prevent contamination of the heated semiconductor body by diffusion of material from the metallic terminals.

Changes may be made within the scope and spirit of the appended claims.

I claim:

1. An apparatus for producing semiconductor material of highest purity, comprising a vessel forming an elongated tubular chamber into which is conducted semiconductor material in gaseous phase, an elongated carrier body disposed horizontally and axially within the tubular elongated chamber and made of semiconductor material corresponding to that carried by said gaseous phase, terminal means for conducting current through said carried body so as to heat it for the purpose of causing the semiconductor material of said gaseous phase to be deposited thereon, and means for producing a magnetic field which is operative to counteract the effect of gravitational force affecting said carrier body.

2. An apparatus according to claim 1, wherein the lines of force of said magnetic field extend perpendicular to the axis of said carrier body and perpendicularly to the direction of gravity substantially throughout the length of said body.

3. An apparatus according to claim 2 comprising means for regulating the magnitude of the force generated by at least one of the components named including said current and said magnetic field.

4. An apparatus according to claim 2 comprising means for generating a non-homogeneous magnetic field, the field strength of which increases in the direction of the gravitational force.

5. An apparatus according to claim 2, wherein the magnitudes of the two components including said current and said magnetic field affecting said carrier body operate to maintain such body in suspension.

6. An apparatus according to claim 2 comprising means for respectively regulating the current I flowing through said body and the field strength B so as to satisfy the equation $I \cdot B = $ constant.

7. An apparatus according to claim 2 comprising means for conducting through said carrier body at least two alternating currents.

8. An apparatus according to claim 2 comprising means for conducting through said carrier body an alternating current and a direct current, and means for regulating said direct current to cause suspension of said carrier body in said magnetic field.

9. An apparatus according to claim 2 comprising means for conducting through said carrier body alternating current with a frequency from about 10 to 100 cycles and simultaneously a direct current, and means for regulating said direct current to cause suspension of said carrier body in said magnetic field.

10. An apparatus according to claim 2 comprising means for cooling at least the terminal means carrying said carrier body.

References Cited in the file of this patent

UNITED STATES PATENTS

| 1,733,752 | Ramage | Oct. 29, 1929 |
| 2,686,864 | Wroughton et al. | Aug. 17, 1954 |
| 2,686,865 | Kelly | Aug. 17, 1954 |
| 2,692,839 | Christensen et al. | Oct. 26, 1954 |

FOREIGN PATENTS

| 183,119 | Great Britain | Jan. 11, 1923 |